Dec. 25, 1928.
N. CHRISTIANSEN ET AL
1,696,837
INTERMEDIATE GEAR FOR AUTOMOBILES
Filed May 23, 1927    2 Sheets—Sheet 1
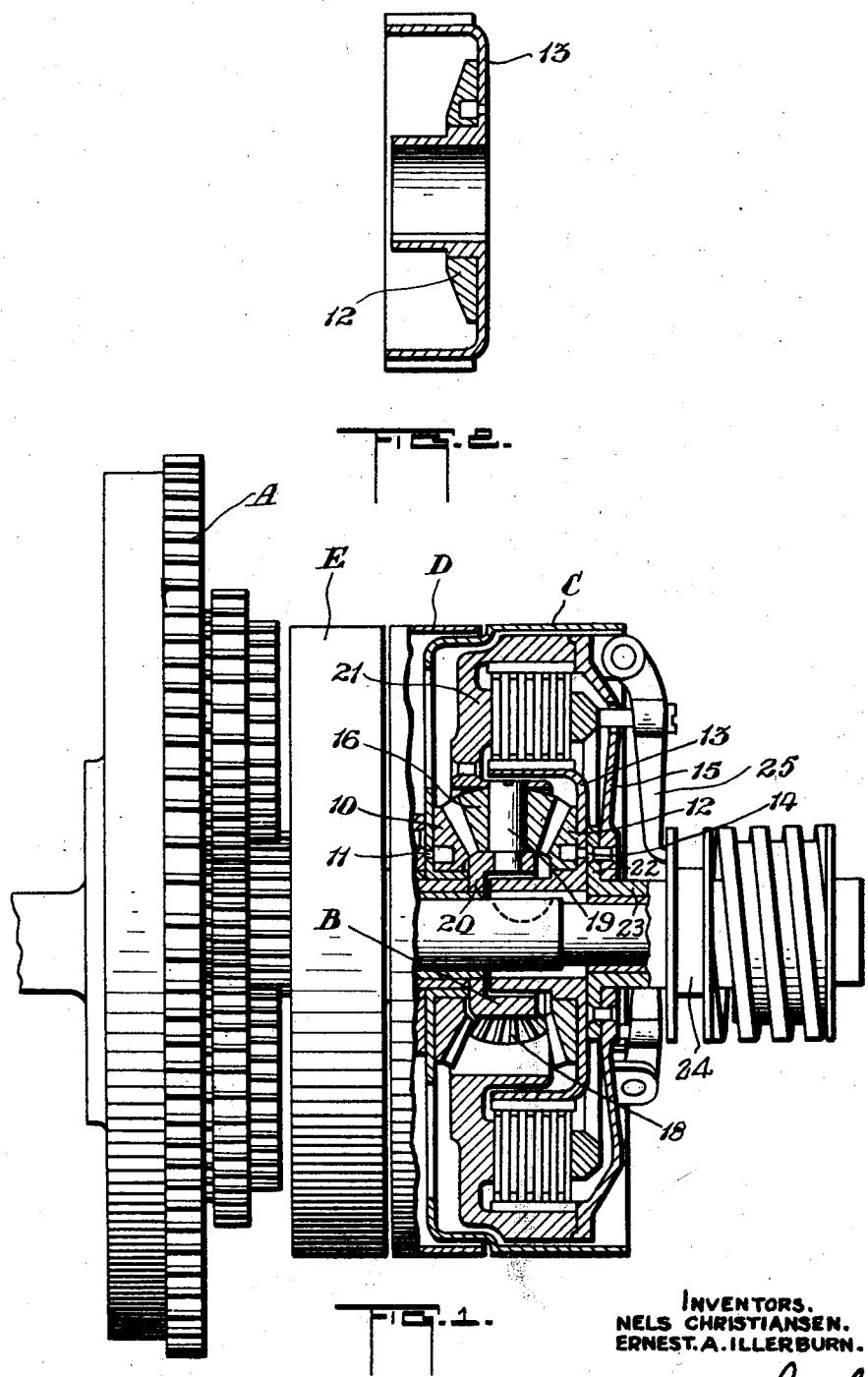
INVENTORS.
NELS CHRISTIANSEN.
ERNEST. A. ILLERBURN.
BY *Fetherstonhaugh & Co.*
ATT'YS.

Dec. 25, 1928.  
N. CHRISTIANSEN ET AL  
1,696,837  
INTERMEDIATE GEAR FOR AUTOMOBILES  
Filed May 23, 1927  
2 Sheets-Sheet 2
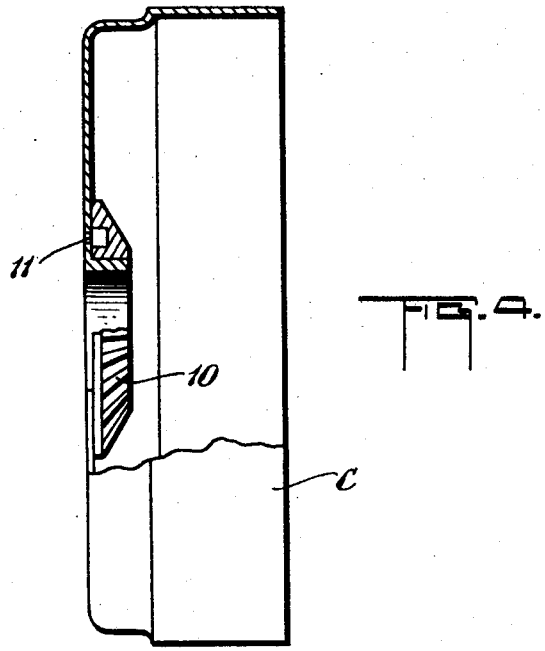
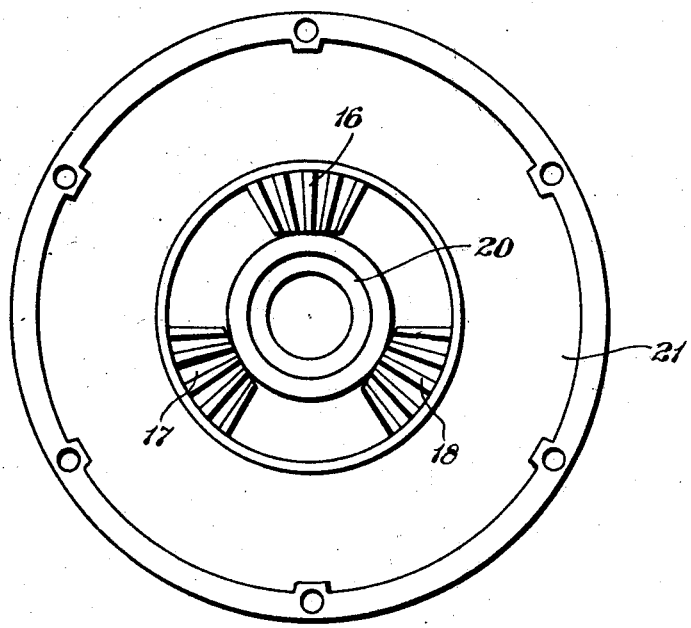
INVENTORS.  
NELS CHRISTIANSEN.  
ERNEST. A. ILLERBURN.
BY *Featherstonhaugh & Co.*
ATT'YS.

Patented Dec. 25, 1928.

1,696,837

UNITED STATES PATENT OFFICE.

NELS CHRISTIANSEN AND ERNEST A. ILLERBURN, OF GULL LAKE, SASKATCHEWAN, CANADA.

INTERMEDIATE GEAR FOR AUTOMOBILES.

Application filed May 23, 1927, Serial No. 193,625, and in Canada May 12, 1927.

This invention relates to improvements in transmissions for automobiles and more particularly to improvements in transmissions adapted for use in Ford motor cars.

The object of the invention is to provide a transmission of this type with a secondary or intermediate speed gearing. A further object of the invention is to provide a simply constructed and readily operable means of this description whereby when the car is released from high gear the brake pedal is used for intermediate gear but when in high or low gear the brake pedal is used for braking purposes.

With the foregoing and other objects in view, hereinafter more fully referred to, the invention consists essentially of a pair of fixed bevel gears spaced and mounted within the brake drum and adapted to be engaged by a series of bevel pinions also mounted within the brake drum.

Referring now to the drawings, in which like characters of reference indicate corresponding parts in each figure, Figure 1 is a side elevation, partly in section, showing our improved intermediate gear fitting into the Ford transmission the casing and operating bands having been removed for purposes of clarity.

Figure 2 is a sectional elevation of one of the gear supporting members with bevel gear mounted thereon.

Figure 3 is a front elevation showing the bevel pinions within the brake drum.

Figure 4 is sectional end view of Figure 3.

Referring now more particularly to the accompanying drawing in which our improved intermediate transmission gear is shown, A indicates a transmission of the planetary type as a whole and B designates the intermediate gear mechanism. The brake drum, low speed drum, and reverse drum are indicated by the letters C, D and E, respectively.

The intermediate gear mechanism B as will be seen by referring to Fig. 1 is mounted within the brake drum C and comprises a bevel gear 10 fixedly secured to the interior of the drum C as at 11 and a bevel gear 12 fixedly secured to the interior of the clutch drum 13 as at 14. A driving plate 15 is rigidly secured in any suitable manner to the flange 22 of the sleeve 23 adjacent the grooved collar 24 operating the clutch lever 25.

Intermediate of these bevel gears and meshing therewith are a series of bevel pinions 16, 17 and 18 each of which is provided with a shaft 19 the whole being operatively supported by the collar 20 and the casting 21.

In operation and assuming that it is desired to move from low speed to intermediate speed, the clutch pedal (not illustrated) is permitted to come into neutral position which releases the drum D. The next movement is to depress the brake pedal (not shown) which will engage and prevent the rotation of the drum C. This operation will also cause the gear 10 secured to the drum to remain stationary with the result that the gears 16, 17 and 18 will rotate both axially and circumferentially.

It will be understood of course that when the transmission is operated to effect low, high, or reverse speed the brake drum is used for braking purposes only and further when the intermediate gear is in operation the hand lever may be used for braking purposes.

It will also be understood that the introduction of the secondary or intermediate gearing to the transmission does not in any way effect the operation of the low, high, or reverse speed.

It will be seen from the foregoing that the addition of the intermediate gear to this type of transmission not only increases the efficiency thereof but prolongs the life of the directly associated parts and the motor car generally.

Heretofore a great deal of damage has been caused to engines dependent on a transmission of two forward speeds, due to the fact that practically all the pulling load was thrown on the low speed gearing. With our invention however it is now possible to distribute the load applied without undue strain.

As many changes could be made in the above construction, and many apparently widely different embodiments of our invention, within the scope of the claims, constructed without departing from the spirit or scope thereof, it is intended that all matter contained in the accompanying specification and drawing shall be interpreted as illustrative and not in a limiting sense.

What we claim as our invention is:

An intermediate speed gear mechanism for planetary transmissions, comprising in combination a drive shaft, a sleeve, a brake drum, a gear for the brake drum, a clutch drum and a gear for the clutch drum, a driving plate secured to the sleeve, a series of pinions mounted intermediate of the aforementioned gears and meshing therewith.

In witness whereof we have hereunto set our hands.

NELS CHRISTIANSEN.
ERNEST A. ILLERBURN.